UNITED STATES PATENT OFFICE.

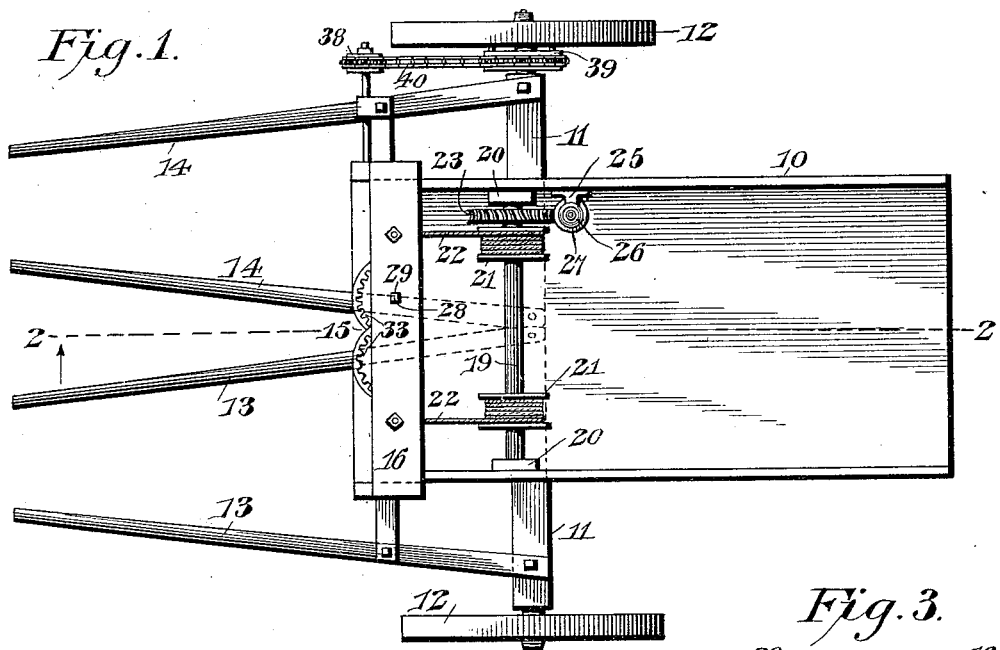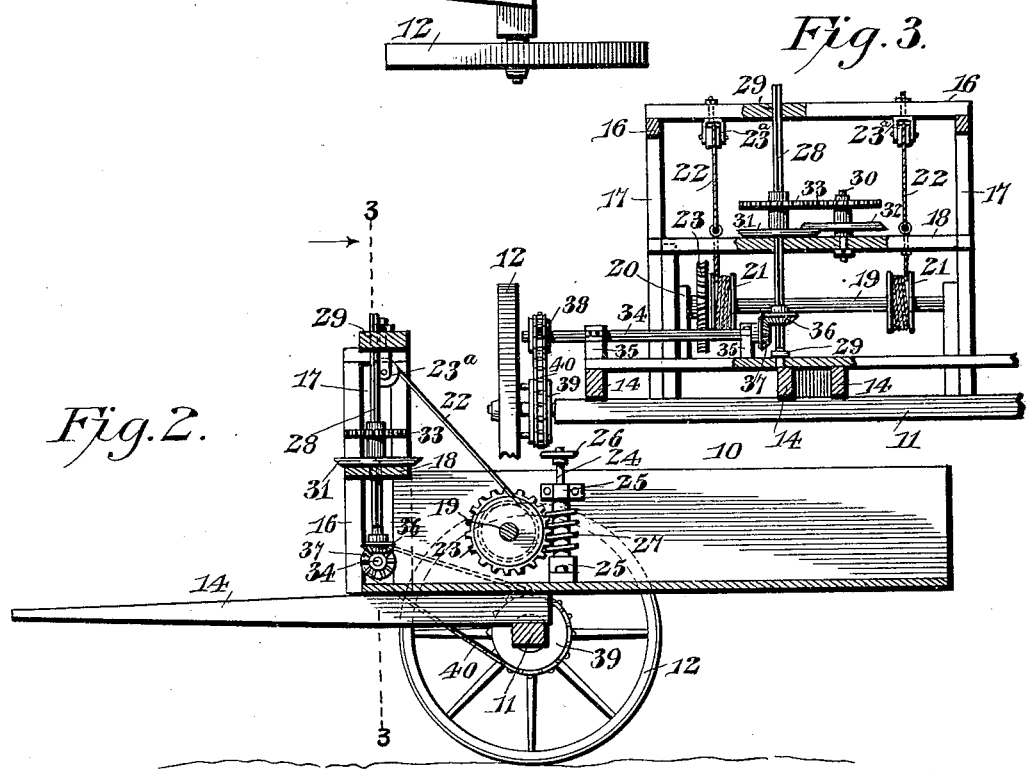

JAMES A. WESTON, OF MOUNT WASHINGTON, MISSOURI.

CORN-HARVESTER.

SPECIFICATION forming part of Letters Patent No. 636,306, dated November 7, 1899.

Application filed July 6, 1899. Serial No. 722,970. (No model.)

*To all whom it may concern:*

Be it known that I, JAMES A. WESTON, a citizen of the United States, residing at Mount Washington, in the county of Jackson and State of Missouri, have invented a new and useful Corn-Harvester, of which the following is a specification.

My invention relates to improvements in corn-harvesters especially designed for the purpose of cutting off and harvesting the heads of that kind of grain known as "Kafir corn," "broom-corn," and "cane."

One object of the invention is to equip the machine with means by which the weight is taken off the necks of the horses of the team, such means serving also to guide or direct the stalks to the cutter mechanism.

A further object of the invention is to provide improved means for adjusting the cutter mechanism in a vertical path in order to bring the same in operative relation to the stalks of different heights for properly cutting the heads thereof, said cutter mechanism including manually-operative appliances that lock the cutter-carrying cross-head at any point of its raised position.

With these ends in view the invention consists in the novel combination, construction, and arrangement of parts, which will be hereinafter fully described and claimed.

In the drawings, Figure 1 is a plan view of a corn-harvester constructed in accordance with my invention. Fig. 2 is a longitudinal vertical section on the plane indicated by the dotted line 2 2 of Fig. 1. Fig. 3 is a vertical transverse section on the plane indicated by the dotted line 3 3 of Fig. 2.

The same numerals of reference are used to designate like and corresponding parts in each of the several figures of the drawings.

In carrying my invention into practice I employ a body or receptacle 10, which may be of the general rectangular construction shown more clearly by Figs. 1 and 2. This body is secured firmly to or otherwise mounted on a transverse axle 11, to the ends of which axle are loosely fitted the carrying-wheels 12.

One of the important features of my invention resides in the employment of two pairs of thills 13 14, suitably connected to the body or the axle, or both, as shown by Fig. 2, said thills being disposed in the same horizontal plane and properly spaced apart to receive the horses of the team. The inner adjacent thills of the two pairs converge rearwardly toward the axle, as clearly represented by Fig. 1, to form a tapering throat or space 15, said space serving to guide or direct the standing stalks of the row to the cutter mechanism when the machine is drawn across the field, the horses of the team walking in the spaces on opposite sides of the row of stalks on which the cutter mechanism is adapted to operate for the severance of the heads of said stalks.

To properly guide or direct the cutter mechanism in its vertical adjustment, I employ an upright frame 16, which is secured firmly to the front part of the body or receptacle 10, and in the side rails of this frame are provided the guideways 17, the latter being preferably in the form of slots.

The active elements of the cutter mechanism are carried by a cross-head 18, which is disposed in a substantially horizontal position within the limits of the upright frame 16, the end portions of said cross-head being fitted slidably in the guideways 17 for directing the travel of the cross-head in a straight line at right angles to the plane of the body or receptacle 10.

19 designates a horizontal shaft arranged transversely within the body contiguous to the upright frame, said shaft being journaled in proper bearings 20, which are fixed to the body or receptacle. This shaft is equipped with spools 21, which are fast therewith, said spools having the cables 22 coiled thereon. These cables extend in an upwardly-inclined direction from the spools of the horizontal shaft, so as to pass over the guide-sheaves 23$^a$, which are suspended from the cross-rail at the upper end of the frame 16, said cables then passing to the cross-head 18 for the purpose of having their otherwise free ends attached to the cross-head, so as to raise the latter on the rotation of the shaft 19 in a direction to coil the cables on the spools 21. This horizontal shaft is provided at or near one end with a worm-gear 23, that is connected operatively with a vertical adjusting-shaft 24, the latter being disposed in a position close to one side of the body or receptacle 10 and mounted in suitable bearings 25, which are secured to said body. Said adjusting-shaft is provided at its upper end with a hand-wheel 26 or other suitable appliance for conveniently rotating the same, and the shaft, furthermore, carries a worm 27, which is arranged to mesh with the teeth of the worm-gear 23 on the horizontal shaft 19. It is evident that the shaft 24 may be rotated for the purpose of turning the horizontal shaft 19, and the employment of the worm-gear between the two shafts serves to lock or hold the shaft 19 against rotation. The rotation of the shaft 19 in one direction by manipulation of the hand-wheel on the shaft 24 serves to coil the cables 22 on the spools, thus making the cables lift the cross-head to the desired position; but a reverse direction of the shafts 19 24 slackens the cables and permits the cross-head to descend, owing to the weight or gravity thereof.

The cutter mechanism which I prefer to employ consists of a pair of revoluble cutter-disks arranged contiguous one to the other or in overlapping relation, as shown by Fig. 3, said cutter mechanism being mounted on the cross-head, so as to be raised or lowered thereby, and being driven positively by motion transmitted from one of the carrying-wheels 12. In this adaptation of the cutter mechanism I provide a polygonal shaft 28, which is disposed in a vertical position on one side of the throat or space 15 between the thills, said polygonal shaft passing loosely through the cross-head 18 and having its end portions properly journaled in bearings 29. A short cutter-shaft 30 is mounted or journaled in the cross-head 18 on the opposite side of the throat or space 15 and parallel to the polygonal shaft 28. The cutter-disks 31 32 are mounted on the shafts 28 30 to rotate therewith; but the cutter-disk 32 is fixed to the short shaft 30, while the other cutter-disk 31 is fitted slidably on the polygonal shaft 28, so as to travel thereon when the cross-head 18 is raised or lowered. The two cutter-disks are connected operatively together by the intermeshing spur-gears 33 for rotation simultaneously in opposite directions. The polygonal shaft 28 is rotated by a horizontally-disposed driving-shaft 34, journaled in proper bearings 35 on the front part of the body, said shafts 28 34 being connected operatively by the intermeshing bevel-gears 36 37. (See Fig. 3.) A sprocket-pinion 38 is fixed to one end of the horizontal driving-shaft 34. A driving-sprocket 39 is fastened to one of the carrying-wheels 12, and the two sprockets engage with an intermediate chain 40, which serves to transmit the motion of the carrying-wheel to the shaft 34, from whence the motion is transmitted through the bevel-gears to the polygonal shaft 28.

From the foregoing description, taken in connection with the drawings, it will be seen that the harvester of my invention may be easily drawn by a team of horses across the field, and the thills 13 14 are connected in the usual manner with the saddles of the harness, so that the weight of the machine is borne on the backs of the horses instead of imposing the weight on the horses' necks. The inner converging thills of the two pairs guide or direct the standing stalks to the throat or space 15 for the purpose of properly presenting the stalks to the cutting mechanism. The cross-head may be raised or lowered by rotating the shaft 24 to coil the cables on the spools or slacken the cables, and this cross-head is guided by the ways 17 of the frame, to be held thereby against displacement. The cutter mechanism may thus be sustained at the proper height for the disks 31 32 to operate on the stalks in order to sever the heads thereof, and the shaft 34 is driven positively by one of the wheels for the purpose of rotating the cutters to secure efficiency in the operation thereof. On the elevation of the cross-head the cutter 32 and its shaft travel therewith, and at the same time the cutter 31 slides on the shaft 28, so as to rise and fall with the cross-head, whereby the cutter 31 is driven from the polygonal shaft and it in turn rotates the cutter 32. The cutter mechanism and the adjusting contrivance for the cross-head are disposed compactly on the body or receptacle 10, so that ample space is provided in the body for the reception of a comparatively large load of the heads which may be severed from the standing stalks.

Changes may be made in the form and proportion of some of the parts, while their essential features are retained and the spirit of the invention is embodied. Hence I do not desire to be limited to the precise form of all the parts as shown, reserving the right to vary therefrom.

Having thus described the invention, what I claim is—

A corn-harvester comprising a wheeled body, the pairs of thills connected thereto and having the inner members of said pairs converging rearwardly and forming guides, a vertically-movable frame guided on the body, a cutter mechanism having the meeting edges of its disks in a vertical plane between the inclined thills, a horizontal shaft journaled on the body in rear of the vertically-adjustable frame, the spools spaced on and fixed to said shaft, the sheaves suspended over the vertically-adjustable frame, cables attached to the frame on opposite sides of the cutter mechanism and passing over the sheaves and coiled on the spools, a worm-gear on the horizontal shaft, and a vertical shaft journaled on the body and provided with a worm which meshes with the worm-gear, whereby the vertical shaft serves as the means for adjusting the horizontal shaft and the cutter-frame and also to lock the parts in their adjusted positions, substantially as described.

In testimony that I claim the foregoing as my own I have hereto affixed my signature in the presence of two witnesses.

JAMES A. WESTON.

Witnesses:
ALONZO B. MCCORMICK,
JOHN W. CAMPBELL.